(12) United States Patent
Lyon et al.

(10) Patent No.: US 11,315,047 B2
(45) Date of Patent: Apr. 26, 2022

(54) BLENDING ELECTRONIC INVENTORY

(71) Applicant: StubHub, Inc., San Francisco, CA (US)

(72) Inventors: Clifford Lyon, Melrose, MA (US); Camila Franco, San Francisco, CA (US); Mats Nilsson, Kentfield, CA (US); Geoff Lester, Oakland, CA (US); Vikram Chalasani, San Ramon, CA (US); Girish Vasvani, Fremont, CA (US)

(73) Assignee: StubHub, Inc., San Francisco, CA (US)

( * ) Notice: Subject to any disclaimer, the term of this patent is extended or adjusted under 35 U.S.C. 154(b) by 671 days.

(21) Appl. No.: 15/017,115

(22) Filed: Feb. 5, 2016

(65) Prior Publication Data
US 2017/0228663 A1   Aug. 10, 2017

(51) Int. Cl.
*G06Q 10/02* (2012.01)
(52) U.S. Cl.
CPC .................................. *G06Q 10/02* (2013.01)
(58) Field of Classification Search
CPC ........................................... G06Q 10/02
USPC ............................................................. 705/5
See application file for complete search history.

(56) References Cited

U.S. PATENT DOCUMENTS

| 8,204,799 | B1* | 6/2012 | Murray ............... G06Q 10/0835 705/26.81 |
| 8,294,549 | B2 | 10/2012 | Samovar et al. |
| 8,401,923 | B1 | 3/2013 | Lester et al. |
| 2002/0082879 | A1 | 6/2002 | Miller et al. |
| 2004/0230440 | A1 | 11/2004 | Malhotra |
| 2005/0144115 | A1 | 6/2005 | Brett |

(Continued)

FOREIGN PATENT DOCUMENTS

| CN | 108604319 A | 9/2018 | |
| WO | WO-2009108641 A2 * | 9/2009 | ............. G06Q 10/06 |

(Continued)

OTHER PUBLICATIONS

Ticketmaster Teams with Facebook So You Can Sit Next to Your Friends. Salter, Chuck. Aug. 24, 2011. Fast Company. pp. 1-5. https://www.fastcompany.com/1774825/ticketmaster-teams-facebook-so-you-can-sit-next-your-friends. (Year: 2011).*

(Continued)

*Primary Examiner* — Jeff Zimmerman
*Assistant Examiner* — Hunter A Molnar
(74) *Attorney, Agent, or Firm* — McDermott Will & Emery LLP

(57) ABSTRACT

Operations to blend electronic inventory are provided. The operations may include obtain a request for multiple seats at a venue and determine a combination of data objects from a data storage that represent seats at the venue that meet the request. The combination of the data objects may include at least one of multiple first data objects and at least one of multiple second data objects. The first data objects may be tagged with a first tag and are associated with first seats in the venue controlled by a first entity and the second data objects may be tagged with a second tag and are associated with second seats in the venue controlled by a second entity, and the combination of the data objects is determined irrespective of whether the data objects include the first tag or the second tag.

20 Claims, 8 Drawing Sheets

(56) References Cited

U.S. PATENT DOCUMENTS

| | | | |
|---|---|---|---|
| 2006/0116916 A1* | 6/2006 | Bowman | G06Q 10/02 705/6 |
| 2007/0276944 A1 | 11/2007 | Samovar et al. | |
| 2008/0281644 A1 | 11/2008 | Payne | |
| 2009/0216571 A1 | 8/2009 | Sunshine et al. | |
| 2010/0131530 A1* | 5/2010 | Gibson | G06F 17/3087 707/758 |
| 2011/0040656 A1 | 2/2011 | Groetzinger et al. | |
| 2011/0082804 A1 | 4/2011 | Swinson et al. | |
| 2011/0166950 A1* | 7/2011 | Goldstein | G06Q 30/08 705/26.3 |
| 2011/0282700 A1* | 11/2011 | Cockcroft | G06Q 10/02 705/5 |
| 2011/0320227 A1 | 12/2011 | Thomas et al. | |
| 2012/0078667 A1† | 3/2012 | Denker | |
| 2012/0166231 A1* | 6/2012 | Denker | G06Q 10/02 705/5 |
| 2012/0173310 A1 | 7/2012 | Groetzinger et al. | |
| 2012/0185394 A1* | 7/2012 | Gelfand | G06Q 10/02 705/44 |
| 2013/0124234 A1 | 5/2013 | Nilsson et al. | |
| 2013/0159030 A1 | 6/2013 | Tattenbaum et al. | |
| 2013/0185103 A1 | 7/2013 | Sunshine et al. | |
| 2013/0339069 A1* | 12/2013 | Hampel | G06Q 10/02 705/5 |
| 2015/0006208 A1 | 1/2015 | Nestor et al. | |
| 2015/0051928 A1 | 2/2015 | Gibson et al. | |
| 2015/0106134 A1 | 4/2015 | Gandham et al. | |
| 2015/0120508 A1* | 4/2015 | Black | G06Q 30/0635 705/26.81 |
| 2015/0287119 A1* | 10/2015 | Bhan | G06Q 30/0627 705/5 |
| 2016/0189060 A1 | 6/2016 | Ngo et al. | |
| 2016/0350680 A1 | 12/2016 | Sweeney et al. | |
| 2018/0189684 A1 | 7/2018 | Vasvani | |

FOREIGN PATENT DOCUMENTS

| | | | |
|---|---|---|---|
| WO | 2016196398 A1 | 12/2016 | |
| WO | 2017136368 A1 | 8/2017 | |

OTHER PUBLICATIONS

International Search Report and Written Opinion from International App No. PCT/US2017/15904, dated Apr. 21, 2017, 11 pgs.
First Action Interview, Pre-Interview Communication received for U.S. Appl. No. 15/167,875, dated Apr. 17, 2019, 4 pgs.
Response to First Action Interview, Pre-Interview Communication filed May 13, 2019, for U.S. Appl. No. 15/167,875, 8 pgs.
First Action Interview, Office Action Summary received for U.S. Appl. No. 15/167,875, dated Jun. 10, 2019, 6 pgs.
Response to First Action Interview, Office Action Summary filed Aug. 9, 2019, for U.S. Appl. No. 15/167,875, 18 pgs.
Final Office Action received for U.S. Appl. No. 15/167,875, dated Oct. 17, 2019, 24 pgs.
Response to Final Office Action filed Dec. 17, 2019, for U.S. Patent Application No. 15/167,875, 21 pgs.
Advisory Action received for U.S. Appl. No. 15/167,875, dated Jan. 7, 2020, 2 pgs.
First Action Interview, Pre-Interview Communication received for U.S. Appl. No. 15/396,256, dated Sep. 11, 2019, 4 pgs.
Response to First Action Interview, Pre-Interview Communication filed Oct. 10, 2019, for U.S. Appl. No. 15/396,256, 4 pgs.
First Action Interview, Office Action Summary received for U.S. Appl. No. 15/396,256, dated Jan. 27, 2020, 7 pgs.
International Search Report and Written Opinion from International Application No. PCT/US2016/034903, dated Sep. 1, 2016, 12 pgs.
Extended European Search Report received for European Patent Application No. 17748030.8, dated May 23, 2019, 10 pgs.
U.S. First Action Interview Office Action Summary, as issued in connection with U.S. Appl. No. 15/396,256, dated Jun. 15, 2020, 4 pgs.
Non-Final Office Action received for U.S. Appl. No. 15/167,875, dated Jun. 9, 2020, 10 pgs.
Final Office Action received for U.S. Appl. No. 15/167,875, dated Nov. 24, 2020, 11 pgs.
Final Office Action received for U.S. Appl. No. 15/396,256, dated Oct. 16, 2020, 8 pgs.
CNIPA—Chinese Office Action for related application No. 201780010141.3 dated Aug. 31, 2021 (translation in English and Chinese), 19 pgs.

\* cited by examiner
† cited by third party

BLENDING ELECTRONIC INVENTORY

FIELD

The embodiments discussed herein are related to blending electronic inventory.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell and distribute a wide variety of goods to take advantage of the many benefits provided by the Internet and electronic commerce.

One example of a market for goods within the realm of electronic commerce is the online ticket market. Network-based systems may implement online ticket markets for buyers and sellers of tickets for live events such as sports, concerts, theater, and other entertainment events.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
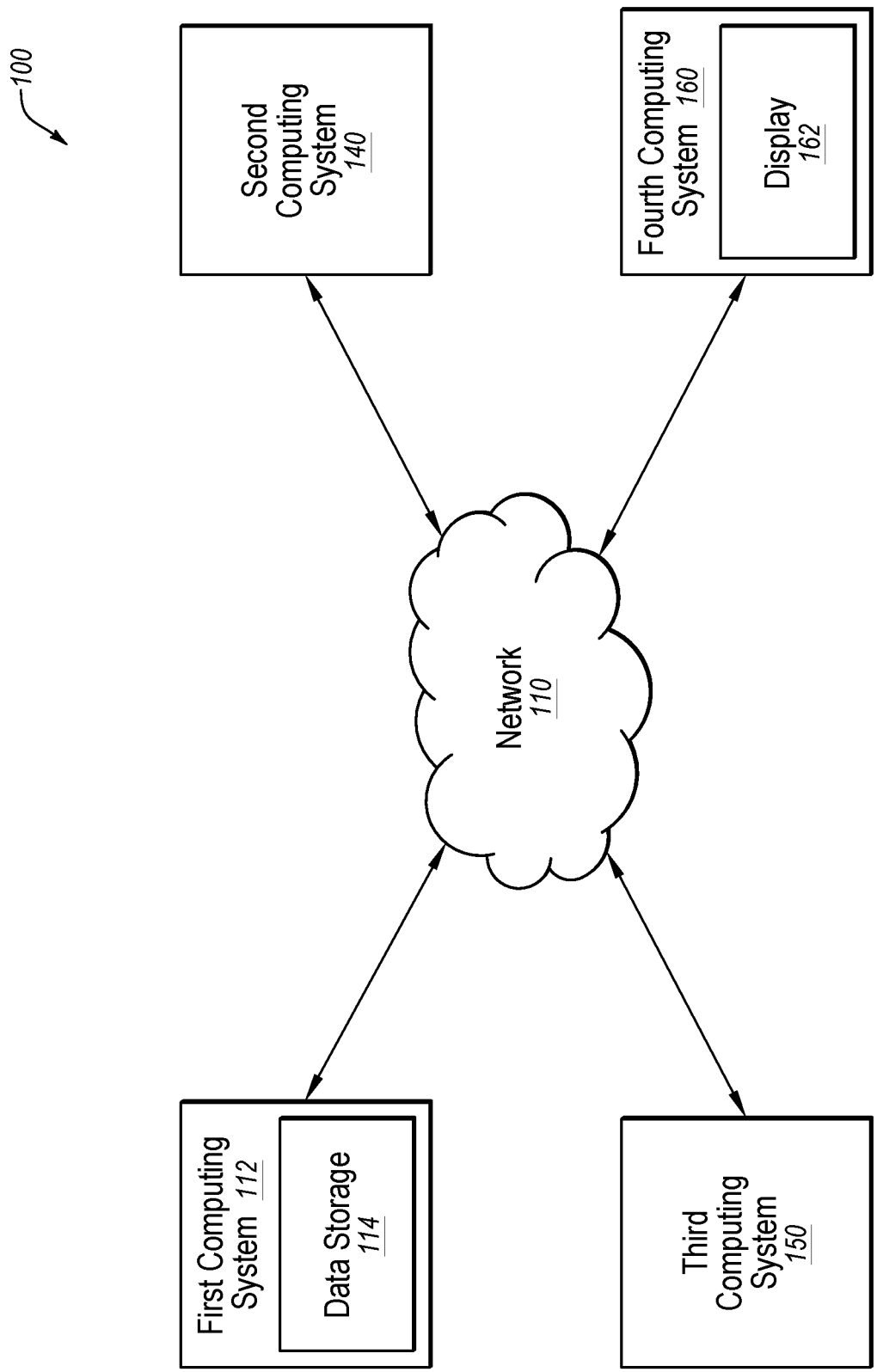
FIG. 1 illustrates an example system that may be used to blend electronic inventory.

Some embodiments herein relate to operations to blend electronic inventory at an online ticket market. Online ticket markets provide a place for sellers of seats at venues to post and sell their seats to buyers. In some circumstances, the sellers that participate on an online ticket marketplace for a given venue may include the venue itself and others that are reselling seats purchased from the venue. As used herein, a venue selling its own seats may be referred to in this disclosure as a primary seller. For example, for a game at venue X, venue X or the owner of venue X selling seats for the first time for the event may be referred to as the primary seller. Other sellers that resell seats previously purchased for the venue may be referred to in this disclosure as secondary sellers.

In some circumstances, online ticket markets may sell seats from both a primary seller and one or more secondary sellers for a single event. Systems and methods described in this disclosure may describe how an online ticket marketplace may blend tickets from multiple different sellers such that a buyer may purchase tickets from multiple different sellers in a single transaction without being aware that the buyer is purchasing tickets from multiple sellers. In these and other embodiments, the multiple sellers may be a combination of multiple different secondary sellers or a combination of a primary seller with one or more secondary sellers.

Blending seat inventory from multiple sellers presents various technical hurdles that some embodiments in this disclosure may address. For example, ticket data from multiple sources may be formatted differently, which may make it difficult to store the data in a single database to allow the online ticket marketplace to perform searches in real-time based on inputs from potential buyers. Other hurdles involve verifying with multiple systems that seats are still available before purchases are completed as some sellers may offer seats for sale on multiple different online ticket marketplaces, either hosted by third parties or by themselves. Thus, this disclosure provides technical advances in database management and systems verification as related to online ticket marketplaces.

For example, in some embodiments, blending inventory by an online ticket marketplace may include the online ticket marketplace obtaining first data regarding seats for sale from a first system of a primary seller and formatting the first data into first data objects for storage in a data store. The first data objects may be tagged with a first tag to indicate that they are from the primary seller.

Alternately or additionally, the online ticket marketplace may obtain second data regarding seats for sale from a second system of a secondary seller. The second data may be formatted into second data objects for storage in the data store with the first data objects. The second data objects may be tagged with a second tag to indicate that they are from the secondary seller.

A request for seats may be received at the online ticket marketplace from a third system of a buyer. For example, a buyer may request four seats in a particular location of a venue. The data store may be searched to find combinations of seats that meet the buyer's request. The seats may be searched for irrespective of the sellers that own the seats. As a result, a four seat combination that may meet the buyer's request may include seats from a primary seller and one or more secondary sellers. The combinations of seats may be provided to the buyer for review by the buyer. The online ticket marketplace may provide the combination of seats in a manner such that the buyer is unaware that the seats are owned by different parties. For example, the seats may be packaged together and presented in a manner to not distinguish between the origins of the seats such that the buyer may purchase the seats in a single transaction and without knowing that the seats in the single seat combination and package are owned by different parties.

In some embodiments, a buyer may request to purchase a combination of the seats presented. Because the data store is not continuously updated with information from the primary and secondary sellers, the online ticket marketplace may verify with the first and second systems of the primary and secondary sellers that the seats are still available before confirming the purchase request. In these and other embodiments, the online ticket marketplace may identify the sellers with seats in the requested combination of seats based on the tags in the data objects associated with the seats in the requested combination. The online ticket marketplace may send notifications to the systems of the sellers and confirm the purchase request based on the responses from the systems of the sellers. In these and other embodiments, if a single seller indicates that the tickets are not for sale, the online ticket marketplace may deny the purchase request.

Turning to the figures, FIG. 1 illustrates an example system 100 that may be used to blend electronic inventory. The system 100 may be arranged in accordance with at least one embodiment described in the present disclosure. The system 100 may include a network 110, a first computing system 112, a second computing system 140, a third computing system 150, and a fourth computing system 160 that includes a display 162.

The network 110 may be configured to communicatively couple the first computing system 112 with the second computing system 140, the third computing system 150, and the fourth computing system 160. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

In some embodiments, anyone of the first computing system 112, the second computing system 140, and the third computing system 150, may include any configuration of hardware, such as servers and databases that are networked together and configured to perform a task. For example, the first computing system 112, the second computing system 140, and/or the third computing system 150 may include a single computing system that includes one or more processors and memory, such as a server or some other computing system configured to perform operations as described in this disclosure. As another example, the first computing system 112, the second computing system 140, and/or the third computing system 150 may include multiple computing systems, such as multiple servers, that are networked together and configured to perform operations as described in this disclosure. In some embodiments, anyone of the first computing system 112, the second computing system 140, and the third computing system 150 may include computer-readable-instructions that are configured to be executed by one or more devices to perform operations described in this disclosure.

In some embodiments, the first computing system 112 may be configured to host an online ticket marketplace. The online ticket marketplace may be configured to act as a broker between sellers and buyers for seats to a specific venue. For example, a seller may provide information about seats that the seller has at a football game. The online ticket marketplace may provide a listing for the specific seats on a user interface that allows buyers to locate and purchase the seats for the event at the venue. The seller may be a primary seller or a secondary seller of the seats.

In these and other embodiments, the first computing system 112 may include web servers, application servers, messaging servers, API servers, databases, among other servers, databases, and processors, and other devices that may be networked together to perform the functions described in this disclosure. For example, some or all of the functions described in this disclosure by the first computing system 112 may be performed by one or more devices, such as a server, included in the first computing system 112.

In some embodiments, the second computing system 140 may be a system operated by a seller of seats for one or more venues. In some embodiments, the second computing system 140 may include data regarding the seats that are offered for sale. In these and other embodiments, the second computing system 140 and the first computing system 112 may communicate such that the first computing system 112 may obtain the data regarding the seats offered for sale by the second computing system 140.

For example, in some embodiments, the first computing system 112 may include application programming interfaces (APIs) to allow the first computing system 112 to communicate with the second computing system 140. The second computing system 140 may initially communicate with the first computing system 112 and indicate that the second computing system 140 includes seats for sale. In these and other embodiments, the first computing system 112 may access the second computing system 140 and collect the data from the second computing system 140. For example, the second computing system 140 may be operated by a primary seller of seats for a venue. Alternately or additionally, the second computing system 140 may be operated by a secondary seller of seats for a venue. As an example, the secondary seller of seats may be a broker that consistently buys and sells tickets. After seats are available for a venue, the first computing system 112 may access the second computing system 140 and obtain the data regarding the seats.

Alternately or additionally, the second computing system 140 may provide data regarding the seats to the first computing system 112 using other networking methods. For example, the first computing system 112 may host a web site that may be accessed using the second computing system 140. In these and other embodiments, the website may include an interface through which the second computing system 140 may provide the data to the first computing system 112. For example, the second computing system 140 may be operated by a secondary seller of seats with a limited number of seats. For example, a single individual may have seats for a venue. The single individual may access the online ticket marketplace using the second computing system 140 and provide data about the limited number of seats to the first computing system 112 over the network 110 by way of an interface provided by the first computing system 112.

In some embodiments, the third computing system 150 may also be a system operated by a seller of seats for one or more venues. In these and other embodiments, the third computing system 150 may include data regarding the seats that are offered for sale through the third computing system 150. In these and other embodiments, the third computing system 150 and the first computing system 112 may communicate such that the first computing system 112 may obtain the data regarding the seats offered for sale through the third computing system 150. In some embodiments, the third computing system 150 may be controlled by a venue, by a broker, or by an individual in an analogous manner as explained above with respect to the second computing system 140.

In some embodiments, the second computing system 140 and the third computing system 150 may both be offering seats for sale for the same venue. For example, the second computing system 140 may be controlled by a primary seller and the third computing system 150 may be controlled by a secondary seller such that both the second computing system 140 and the third computing system 150 provide data about seats for sale to the first computing system 112 about the same venue.

The first computing system 112 may receive the data from the second computing system 140 and the data from the third computing system 150. The data from both the second computing system 140 and the third computing system 150 may include an indication of the location of the seats and a price for each of the seats.

The first computing system 112 may be configured to format the data from the second computing system 140 and the data from the third computing system 150. After formatting the data, the first computing system 112 may place the data from the second computing system 140 into data objects in a data storage 114. The first computing system 112 may also place the data from the third computing system 150 into data objects in the data storage 114.

The data storage 114 may be a database in the first computing system 112 with a structure based on data objects. For example, the data storage 114 may include multiple data objects with different fields. Each of the data objects may correspond with a seat in a particular venue. The first computing system 112 may place the data from the second computing system 140 and the third computing system 150 into corresponding data objects in the data storage 114.

In some embodiments, the first computing system 112 may also tag the data from the second computing system 140 with a first tag. The first computing system 112 may also tag the data from the third computing system 150 with a second tag. The first and second tags may identify the source of the data in the data object. For example, a data object for a particular seat may be tagged to indicate that the particular seat is provided to the first computing system 112 by the third computing system 150 and the first computing system 112 is selling the particular seat on behalf of an entity associated with the third computing system 150. In some embodiments, the first and second tags may include identifiers from the second computing system 140 and the third computing system 150 to allow the second computing system 140 and the third computing system 150 to readily identify the seat associated with the identifier.

After obtaining the data from the second computing system 140 and the third computing system 150, the first computing system 112 may offer the seats from the data for sale on the online ticketing marketplace. In these and other embodiments, the first computing system 112 may host a web site that may allow buyers to search, locate, and purchase seats.

The fourth computing system 160 may be associated with a buyer. In these and other embodiments, the fourth computing system 160 may be any type of computing system. For example, the fourth computing system 160 may be a desktop computer, tablet, mobile phone, smart phone, or some other computing system. The fourth computing system 160 may include an operating system that may support a web browser. Through the web browser, the fourth computing system 160 may request webpages from the first computing system 112 pertaining to the online ticketing marketplace. The requested webpages may be displayed on the display 162 of the fourth computing system 160 for presentation to a user of the fourth computing system 160.

The first computing system 112 may be configured to present seats on webpages without differentiating between the sellers of the seats. For example, the first computing system 112 may generate a webpage that presents available seats for purchase in a map of a venue. The webpage may not differentiate between sellers of the seats. Thus, all seats available for sale by the first computing system 112 may be presented in the same manner. Thus, seats from a primary seller and seats from a secondary seller may be presented in the same manner by the fourth computing system 160. In some embodiments, the first computing system 112 may differentiate between seats from a primary seller and from a secondary seller. Alternately or additionally, the first computing system 112 may only present seats from a primary seller or from secondary sellers. In these and other embodiments, the first computing system 112 may adjust the presentation of the seats based on requests from a primary seller, a secondary seller, and/or a buyer.

In some embodiments, the fourth computing system 160 may request a number of seats from the first computing system 112. Based on the request, the first computing system 112 may determine combinations of seats that meet the request. In these and other embodiments, the first computing system 112 may search the data storage 114 to determine clustering of seats that meet the request. For example, the fourth computing system 160 may request four seats. In these and other embodiments, the first computing system 112 may search the data storage 114 to determine a combination of seats that are located spatially next to each other in the venue. When determining the combination of the seats, the first computing system 112 may determine the combination irrespective of the sellers of the seats. For example, the first computing system 112 may search the data objects to determine four seats spatially located together in the venue. During the search, the first computing system 112 may not consider the tags of the data objects that distinguish the seller of the seats. Thus, seat combinations that meet a request from the fourth computing system 160 may include one or more seats provided by the second computing system 140 and/or one or more seats provided by the third computing system 150.

Alternately or additionally, the first computing system 112 may determine seat combinations that meet the request based on seats provided by a primary seller, secondary sellers, a single secondary seller, or some other combination. In these and other embodiments, the first computing system 112 may determine the seats to include in seat combinations based on requests from a primary seller, secondary sellers, and/or the buyers. In these and other embodiments, the first computing system 112 may change the seats included in the seat combinations at different times. For example, the first computing system 112 may determine seat combinations using all available seats in the data storage 114. Based on a request from a primary seller, such as from the second computing system 140, the first computing system 112 may determine seat combinations using only seats from the primary seller in the data storage 114. After another request from the primary seller, the first computing system 112 may again determine seat combinations using all available seats in the data storage 114.

The first computing system 112 may present the combinations of seats that fulfill the seat request to the fourth computing system 160. The fourth computing system 160 may receive and present the combinations of seats. The combination of seats may be presented in a manner that does not distinguish between seats associated with different sellers. The fourth computing system 160 may issue a single purchase request to the first computing system 112 for the combination of seats. The purchase request may be a single request for a single transaction with a single seller from the perspective of the fourth computing system 160 as the fourth computing system 160 may not be aware that the seats in the combination of seats are from different sellers.

The first computing system 112 may receive the purchase request. In some embodiments, the first computing system 112 may have authorization to sell the seats in the combination. In these and other embodiments, the seats may not be being sold through other seats vendors such that the first computing system 112 knows that the seats are available. In these and other embodiments, the first computing system 112 may authorize the transaction.

In some embodiments, one or more of the seats in the combination may be being sold through other vendors such that the first computing system 112 does not know that the seat is available. For example, the first computing system 112 may refresh the available seats based on updated data from the second computing system 140 and the third computing system 150. In these and other embodiments, between when the first computing system 112 refreshes the available seats, a seat may be sold by another online ticket marketplace such that the seat is not available for resale again. Thus, before confirming the purchase of the seat, the first computing system 112 may verify with the origin of the seat that the seat is still available for purchase.

To verify with the origin of the seat, the first computing system 112 may locate the data objects of the requested seats in the data storage 114. Based on the tags of the data objects, the first computing system 112 may obtain the origin of the seat. In these and other embodiments, the first computing system 112 may send a notification to the system from which the seat originates regarding holding the seat or the availability of the seat. Based on a response from the system, the first computing system 112 may provide confirmation of the purchase request or deny the purchase request.

For example, when the data object includes a first tag, the first computing system 112 may send a notification to the second computing system 140 regarding holding the seat or the availability of the seat. The second computing system 140 may confirm the availability or that the seat is held to the first computing system 112. In response, the first computing system 112 may send a confirmation of the purchase request to the fourth computing system 160.

In some embodiments, the seat combination may include seats from multiple sellers. In these and other embodiments, the first computing system 112 may perform a verification process with each of the different sellers. As a result, the first computing system 112 may perform a verification process with multiple systems. To perform the verification, the first computing system 112 may locate the data objects of the requested seats in the data storage 114. Based on the tags of the data objects, the first computing system 112 may obtain the origins of the seats. In these and other embodiments, the first computing system 112 may send a notification to the systems from which the seats originate regarding holding the seats or the availability of the seats. After all of the responses are received and all of the responses indicate that all of the seats are available, the first computing system 112 may confirm the request. If one or more of the systems responds and indicates that a seat is not available, the purchase request may be denied, as the combination of seats would not be available.

After confirming the purchase, the first computing system 112 may perform further actions to fulfill the purchase request. For example, the first computing system 112 may handle funds transfers between different systems. Alternately or additionally, the first computing system 112 may coordinate the delivery of tickets for the seats to a user of the fourth computing system 160.

Modifications, additions, or omissions may be made to the system 100 without departing from the scope of the present disclosure. For example, the system 100 may include additional computing systems that may provide seats to the first computing system 112 for the online ticket marketplace to resell besides the second computing system 140 and the third computing system 150. Furthermore, multiple other computing systems may access the online ticket marketplace hosted by the first computing system 112 to buy seats.

Figure 2:
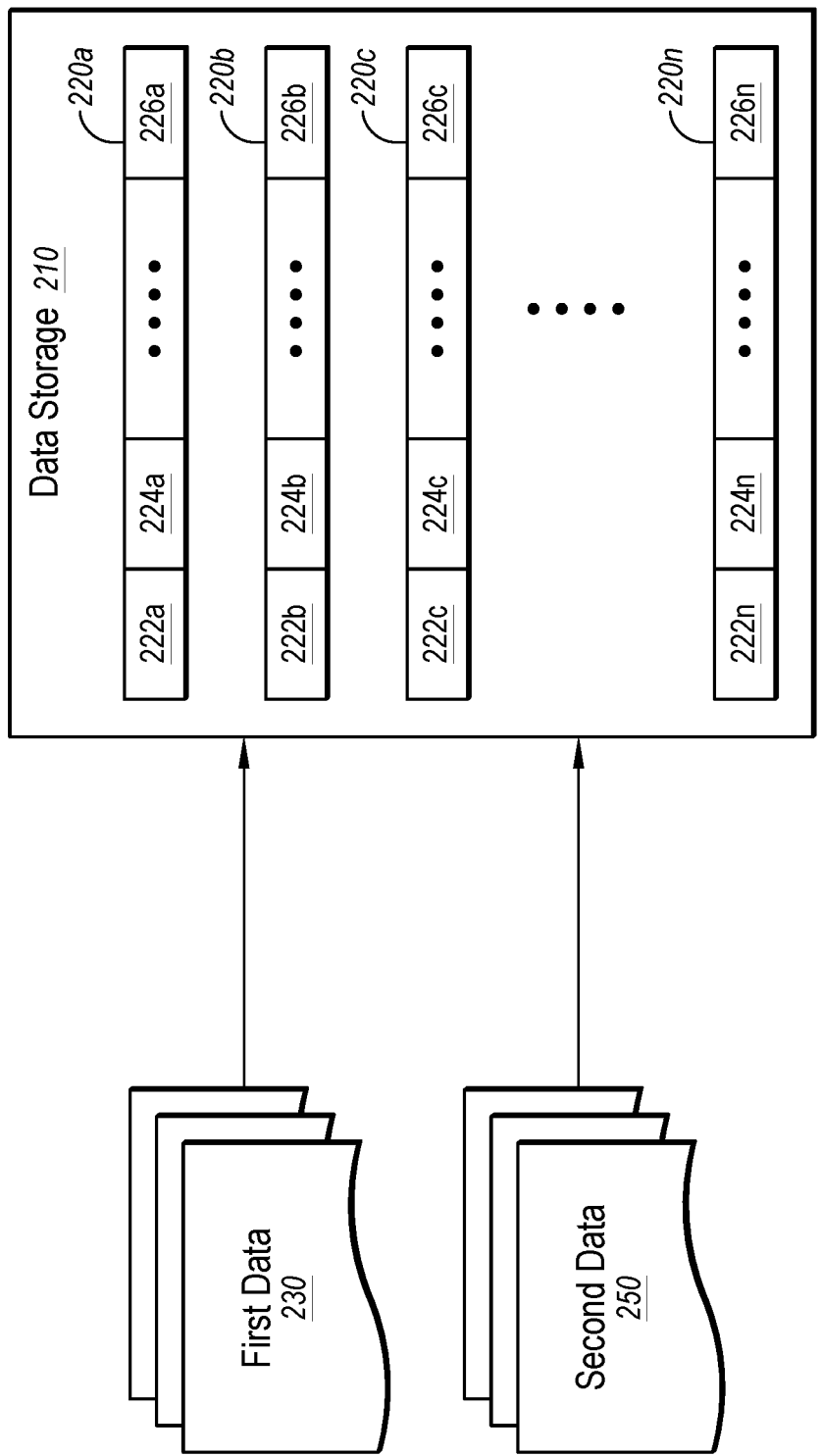
FIG. 2 illustrates a configuration of an example data storage.

FIG. 2 illustrates a configuration of an example data storage 210. The data storage 210 may be arranged in accordance with at least one embodiment described in the present disclosure. The data storage 210 may be part of a computing system that hosts an online ticket marketplace. For example, the data storage 210 may be part of the first computing system 112 and be analogous to the data storage 114 of FIG. 1. In these and other embodiments, the data storage 210 may be configured to store information about seats for venues available for purchase.

The data storage 210 may include multiple data objects 220. FIG. 2 illustrates a first data object 220a, a second data object 220b, a third data object 220c, and an nth data object 220n. Each of the data objects 220 may include information for a seat at a particular venue. In these and other embodiments, the data objects 220 may be for a particular event and venue. In these and other embodiments, the data storage 210 may include other partitions for other venues and/or events.

Each of the data objects 220 may include various data fields, such as the data fields 222, 224, and 226. As illustrated, the first data object 220a may include a first data field 222a, a second data field 224a, and a third data field 226a. The second data object 220b may include a first data field 222b, a second data field 224b, and a third data field 226b. The third data object 220c may include a first data field 222c, a second data field 224c, and a third data field 226c. The nth data object 220n may include a first data field 222n, a second data field 224n, and a third data field 226n.

The data fields 222 in the data objects 220 may include information such as location in the venue, such as a section, row, seat, etc. The data fields may include other information, such as a price and surrounding seats. Alternately or additionally, the data fields 222 may include a field that allows a data object 220 to be tagged with an origin of the seat that is included in the data object 220.

Data obtained from systems about seats for sale may be placed in the data storage 210. For example, first data 230 and second data 250 may be placed in the data storage 210. The first data 230 and the second data 250 may be formatted differently than the data objects 220. Furthermore, the first data 230 and the second data 250 may be formatted differently and/or include different information as the first data 230 and the second data 250 may be provided from different sources. For example, the first data 230 may originate from a system controlled by a primary seller of seats. In contrast, the second data 250 may originate from a system controlled by a secondary seller of seats.

To correctly input the first data 230 and the second data 250, the first data 230 and the second data 250 may first be parsed to determine the aspects of the individual seats included in the data. For example, the first data 230 may list a section, a row, and cluster multiple seats within the section as including a single price. By parsing the first data 230, a price may be correlated with each of the seats, such that each data object 220 for each seat includes a price. As another example, the second data 250 may be provided by a secondary seller. In these and other embodiments, the second data 250 may be clusters of seats packaged for selling by the secondary seller. For example, the second data 250 may indicate that it includes seats 1-5 in row A of section 119, each priced at $25. By parsing the second data 250, each seat of the seats 1-5, with its corresponding information may be saved in a single data object 220.

In some embodiments, the first data 230 and the second data 250 may be formatted differently. Thus, after parsing the first data 230 and the second data 250, the first data 230 and the second data 250 may be formatted before being placed in the data storage 210. Before, after, or while the first data 230 and the second data 250 are saved in the data storage 210, each of the data objects 220 that receive seat information is tagged with the origin of the seat. The origin of the seat may indicate a seller/system that provided the data to the data storage 210. In some embodiments, the tag may also include an identifier of the seat used by the system that provided the seat information. In these and other embodiments, the information in the tag may be used after a purchase request by the system that includes the data storage 210 to verify that the seat is still available for purchase. For example, the tag may be used to identify a seller/system that provided the seat and to obtain the identifier of the seat used by the seller. After identifying the seller/system, a notification regarding the availability of the seat that includes the identifier of the seat used by the seller/system may be provided to the seller/system.

Modifications, additions, or omissions may be made to the data storage 210 without departing from the scope of the present disclosure. For example, additional data may be placed in the data storage 210 other than the first data 230 and the second data 250.

Figure 3A:
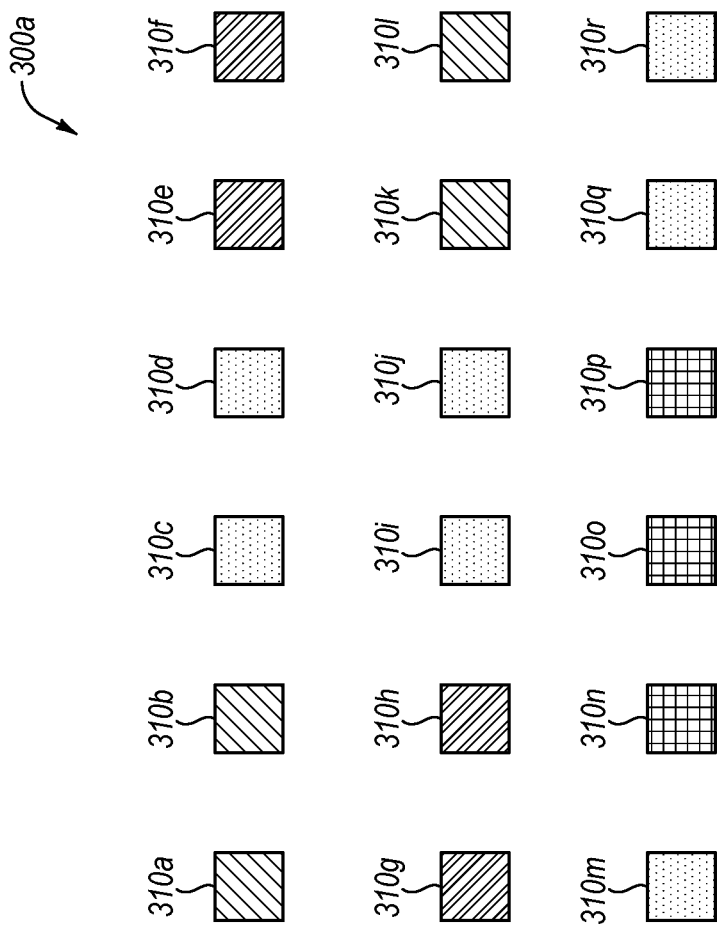
FIG. 3a illustrates an example seat map.
Figure 3A:
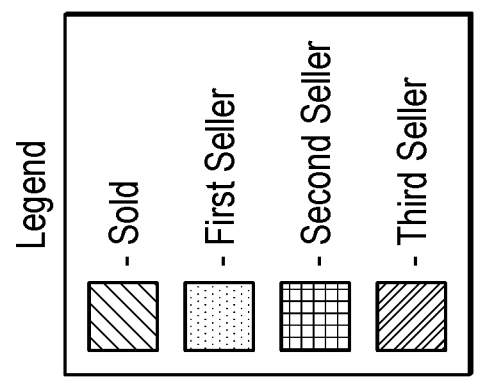

FIG. 3a illustrates an example seat map 300a. The seat map 300a may be arranged in accordance with at least one embodiment described in the present disclosure. The seat map 300a may include eighteen seats 310a-310r, referred to collective or individually in this disclosure, as the seat(s) 310. The seats 310 may be seats that are offered for sale by an online ticket marketplace, such as one hosted by the first computing system 112 of FIG. 1.

The seat map 300a may visually depict information stored in a data storage by an online ticket marketplace for the individual seats 310. For example, the seat map 300a may indicate the sellers and availability of seats. As illustrated, the seats 310a, 310b, 310k, and 310l may be sold such that they are not available. The remaining seats 310c-310j and 310m-310r are being offered for sale by different sellers. The seats 310c, 310d, 310i, 310j, 310m, 310q, and 310r may be offered for sale by a first seller. The seats 310n-310p may be offered for sale by a second seller. The seats 310e-310h may be offered for sale by a third seller.

Figure 3B:
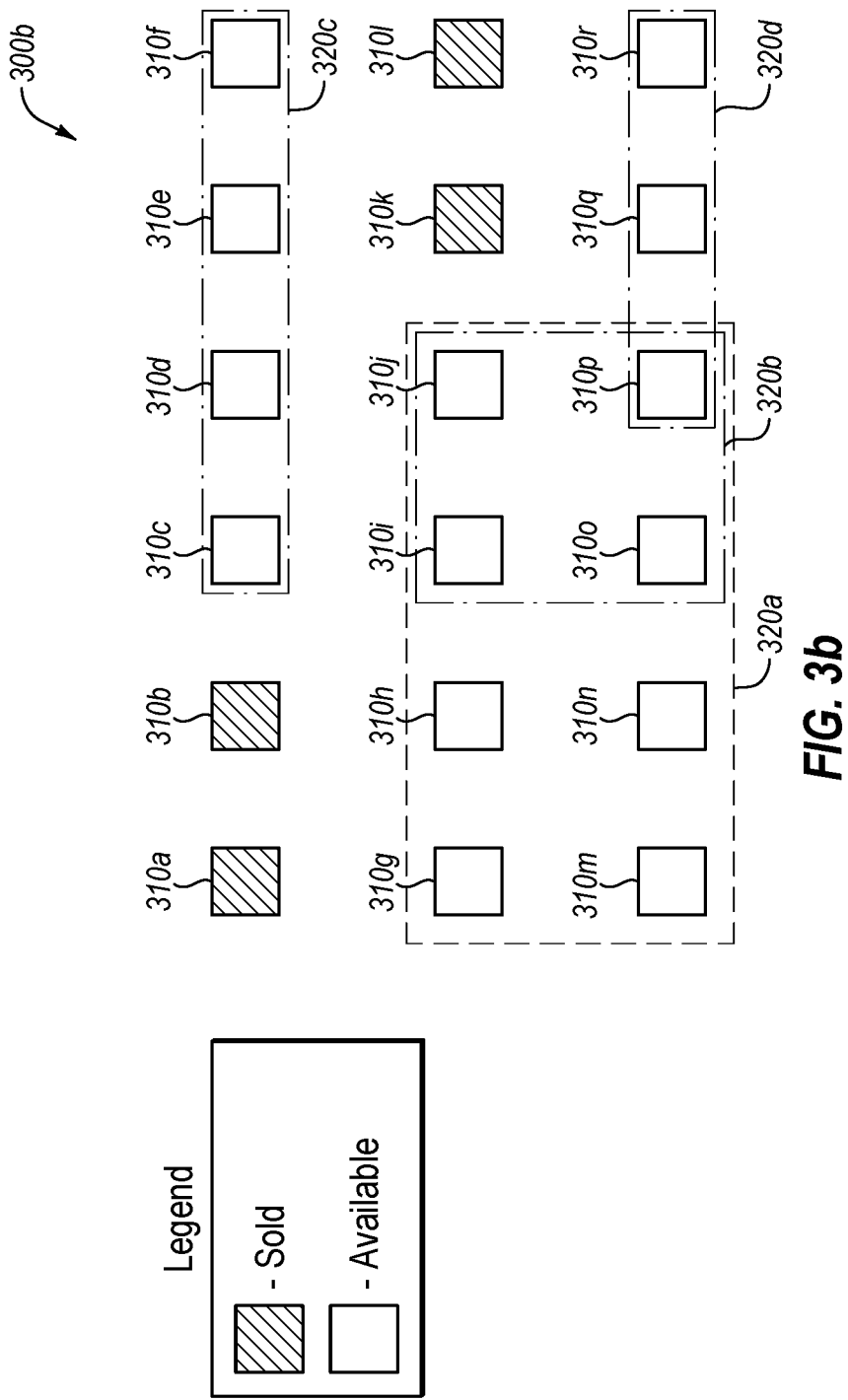
FIG. 3b illustrates another example seat map with seat combinations.

FIG. 3b illustrates another example seat map 300b with seat combinations. The seat map 300b may be arranged in accordance with at least one embodiment described in the present disclosure and may include seats 310a-310r as depicted in FIG. 3a. The seat map 300b may visually depict the seats 310 as presented by an online ticket marketplace to a buyer for a selection. For example, the first seller may be a primary seller and the second and third sellers may be secondary sellers. In these and other embodiments, the presentation to a buyer may not distinguish between the seats offered by primary and secondary sellers.

Alternately or additionally, the seat map 300b may visually depict how the online ticket marketplace considers the seats 310 as the online ticket marketplace determines seat combinations to meet a buyer's seat request. In some online ticket marketplaces, tickets sold by different sellers are not combined. Additionally, in some online ticket marketplaces, clusters of seats, such as seats spatially located next to each other are not broken apart and combined with seats from other sellers to sell to a buyer in a single transaction.

In contrast, the online ticket marketplace discussed in this disclosure may consider all tickets for sale as available for any requested seat combination, regardless of seller or seat clustering by a seller. For example, the seat map 300b illustrates first, second, third, and fourth seat combinations 320a-320d that may be determined by an online ticket marketplace.

The first seat combination 320a may include eights seats, the seats 310g-310j and 310m-310p. The seats 310g-310j and 310m-310p may be a combination of seats from the first seller, the second seller, and the third seller. In these and other embodiments, the first seat combination 320a may include all of the seats from the second seller and some of the seats from the first seller and the third seller. The first seat combination 320a may combine seats from multiple rows as eight seats on a single row may not be available.

In these and other embodiments, each of the sellers of the seats in the first seat combination 320a may have priced their seats differently. For example, the seats 310g and 310h from the third seller may have a price x, the seats 310i, 310j, and 310m from the first seller may have a price y, and the seats 310n-310p from the second seller may have a price z. When presented to the buyer as a combination, the online ticket marketplace may determine an average price of the seats based on the prices. For example, to determine a total price for the combination, the price x, the price y, and the price z may be added together. A price per seat may be the total price divided by the number of seats. By providing the average price per seat, each seller receives their requested price amount without the buyer necessarily knowing about the price difference as set by the sellers.

The second seat combination 320b may include four seats, the seats 310i, 310j, 310o, and 310p. The seats 310i, 310j, 310o, and 310p may be a combination of seats from the first seller and the second seller. The second seat combination 320b may combine seats from multiple rows.

The third seat combination 320c may include four seats, the seats 310c-310f. The seats 310c-310f may be a combination of seats from the first seller and the third seller. The third seat combination 320c may combine seats on a single row.

The fourth seat combination 320*d* may include three seats, the seats 310*p*-310*r*. The fourth seat combination 320*d* may combine seats from a single row. The seats 310*p*-310*r* may be a combination of seats from the first seller and the second seller. In these and other embodiments, the fourth seat combination 320*d* may include one of the seats from the second seller and some of the seats from the first seller. Note that the fourth seat combination 300*d* removes the seat 310*p* from the cluster of seats 310*n*-310*p* of the second seller. For example, a buyer may want three seats that are near an aisle. Assuming the aisle is next to seats 310*f,* 310*l,* and 310*r,* to meet the request, the seat 310*p* from the second seller is separated from the cluster of seats 310*n*-310*p* and combined with seats 310*q* and 310*r* from the first seller. Note that the online ticket marketplace as described herein may not consider that seats are removed from clusters of seats from a seller when making a seat combination as the online ticket marketplace may not consider sellers when making the seat combinations. Rather, the online ticket marketplace may consider seat location, price, and other factors to determine a seat combination as requested by a buyer.

An online ticket marketplace combining seats from multiple sellers may be able to provide more options to buyers than if seats from multiple sellers are not combined. By providing more options, more seats may be purchased, which may benefit both buyer and seller.

In some embodiments, a seller may request that its clusters of seats not be divided. In these and other embodiments, the online ticket marketplace may not separate seats from the seat clusters of the seller as described with respect to the fourth seat combination 300*d*.

The seat combinations 320 are provided as examples of possible seat combinations. Other seat combinations may be determined by an online ticket marketplace. For example, the seat combinations 320 illustrate configurations across one or two rows of seats that are rectangular or square. Other seat combinations 320 may include "L" shaped combinations that include multiple seats in multiple rows, diamond shape combinations that span across two, three, or more rows of seats, triangular shape combinations that span across two, three, or more rows of seats with a different or same number of seats in every row of seats. Other configuration of seat combinations 320 may also be determined by an online ticket marketplace.

In some embodiments, an online ticket marketplace may determine seat combinations in any manner. For example, the seat combination may be a combination of seat combinations. For example, a request from a user may be for a three seats located spatially directly next to each other that is spatially near two seats located spatially directly next to each other. In these and other embodiments, the three seats and the two seats may have form any combination. For example, the three seat combination may be a triangular combination of seats that are spatially located near a two seat rectangular combination of seats.

As another example, the online ticket marketplace may receive a request for a desired number of seats. The online ticket marketplace may determine a combination of the seats that meet the request. In some embodiments, the combination may be combination of seat combinations. For example, a request may be for six seats. The combination may be a first combination of three seats that are spatially located near a second combination of three seats. The first and second combinations may have any configuration. Alternately or additionally, the first and second combinations may have other number of seats, such as two and four seats, or one and five seats. Thus, any manner in which an online ticket marketplace may determine a combination of seats to meet a request is contemplated by the present disclosure and the scope of the disclosure may be determined by the scope of the claims without further limitation.

Figure 4:
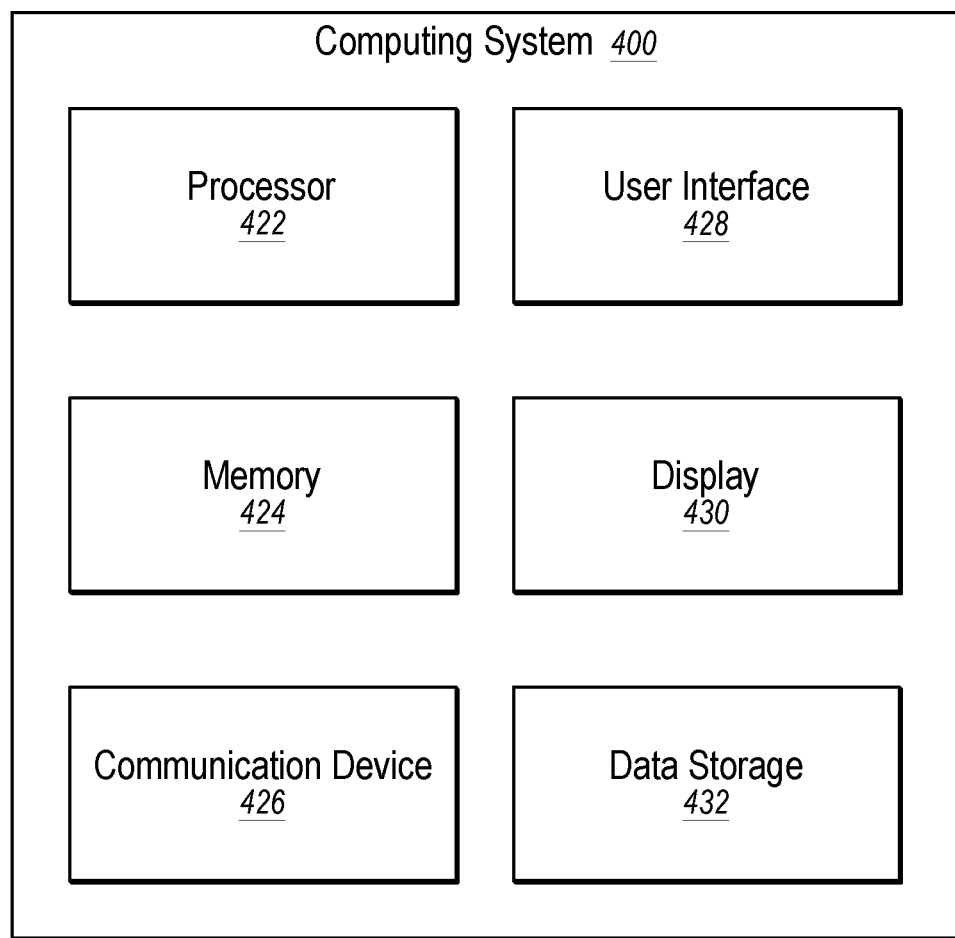
FIG. 4 illustrates an example computing system that may be used in a system to blend electronic inventory.

FIG. 4 illustrates an example computing system 400 that may be used in a system to blend electronic inventory. The computing system 400 may be arranged in accordance with at least one embodiment described in the present disclosure. The computing system 400 may be an example of the first computing system 112, the second computing system 140, the third computing system 150, and/or the fourth computing system 160 of FIG. 1.

The computing system 400 may include a processor 422, a memory 424, a communication device 426, a user interface 428, a display 430; and a data storage 432.

In general, the processor 422 may include any suitable special-purpose or general-purpose computer, computing entity, or processing device including various computer hardware or software modules and may be configured to execute instructions stored on any applicable computer-readable storage media. For example, the processor 422 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 422 may include any number of processors configured to perform individually or collectively any number of operations described herein. Additionally, one or more of the processors may be present on one or more different electronic devices, such as different servers. In some embodiments, the processor 422 may interpret and/or execute program instructions and/or process data stored in the memory 424. In some embodiments, the processor 422 may fetch program instructions from the data storage 432 and load the instructions in the memory 424. After the instructions are loaded into memory 424, the processor 422 may execute the program instructions to perform operations or methods described in this disclosure. For example, the processor 422 may receive instructions, load the instructions into the memory 424, and execute the instructions to perform the operations described in this disclosure.

The memory 424 and/or data storage 432 may include computer-readable storage media for carrying or having computer-executable instructions or data structures stored thereon. Such computer-readable storage media may be any available media that may be accessed by a general-purpose or special-purpose computer, such as the processor 422. By way of example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 422 to perform a certain operation or group of operations.

The communication device 426 may include any component, device, system, or combination thereof that is configured to transmit or receive information over a network. In some embodiments, the communication device 426 may communicate with other devices at other locations, the same location, or even other components within the same system. For example, the communication device 426 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication device 426 may permit data to be exchanged with a network and/or any other devices or systems described in the present disclosure.

The user interface 428 may include any component, device, system, or combination thereof that is configured to provide input from a user to the computing system 400. For example, the user interface 428 may include a mouse, a track pad, a touch screen, a keyboard, or any other device that may interface with the computing system 400 to provide user input to the computing system 400. The display 430 may be any device configured to display or present information to a user.

Modifications, additions, or omissions may be made to the computing system 400 without departing from the scope of the present disclosure. For example, the computing system 400 may include other devices or multiple of the devices discussed. Alternately or additionally, the computing system 400 may not include some of the devices illustrated in FIG. 4.

Figure 5A:
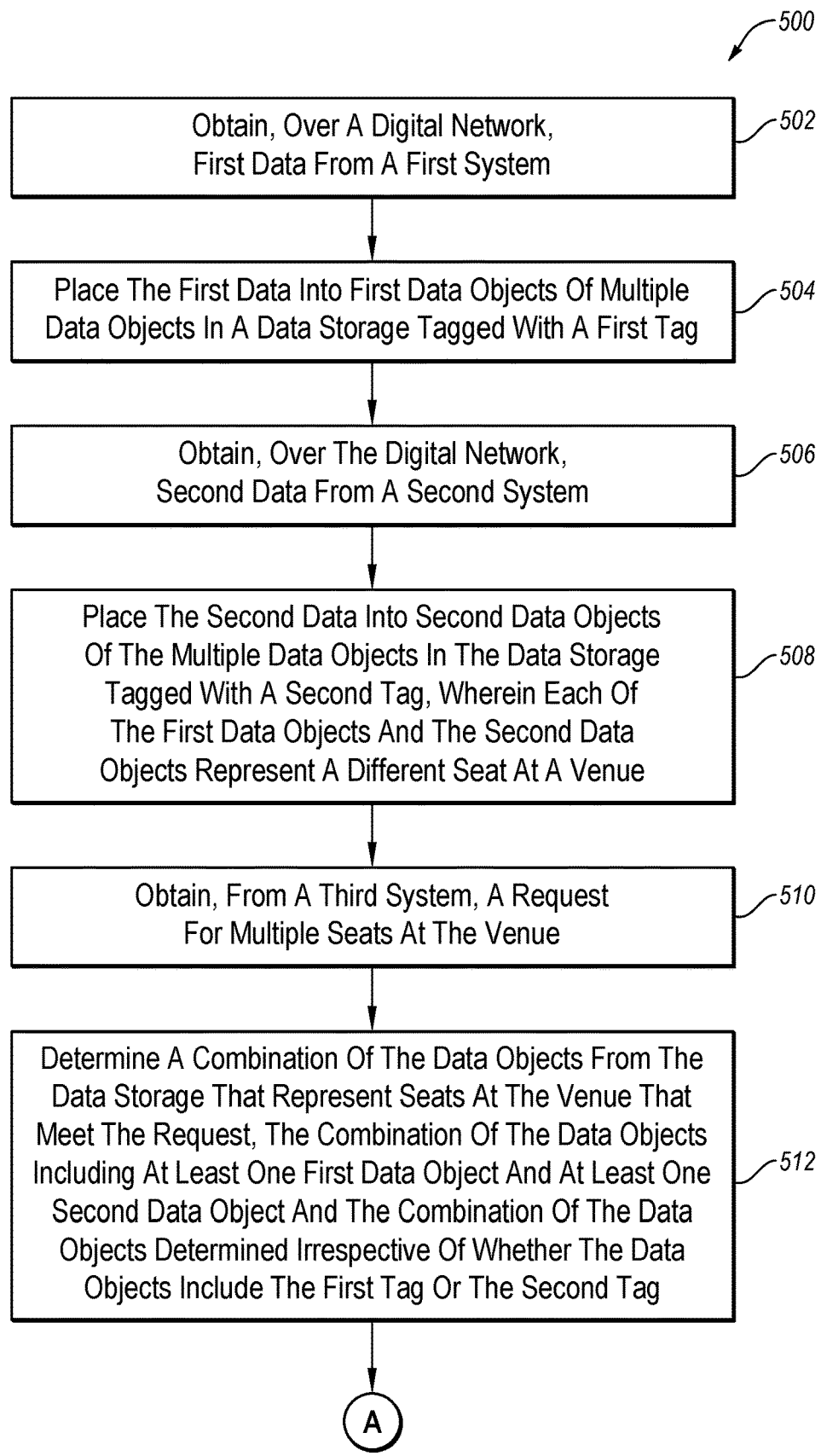
FIGS. 5a and 5b are a flowchart of example operations to blend electronic inventory.
Figure 5B:
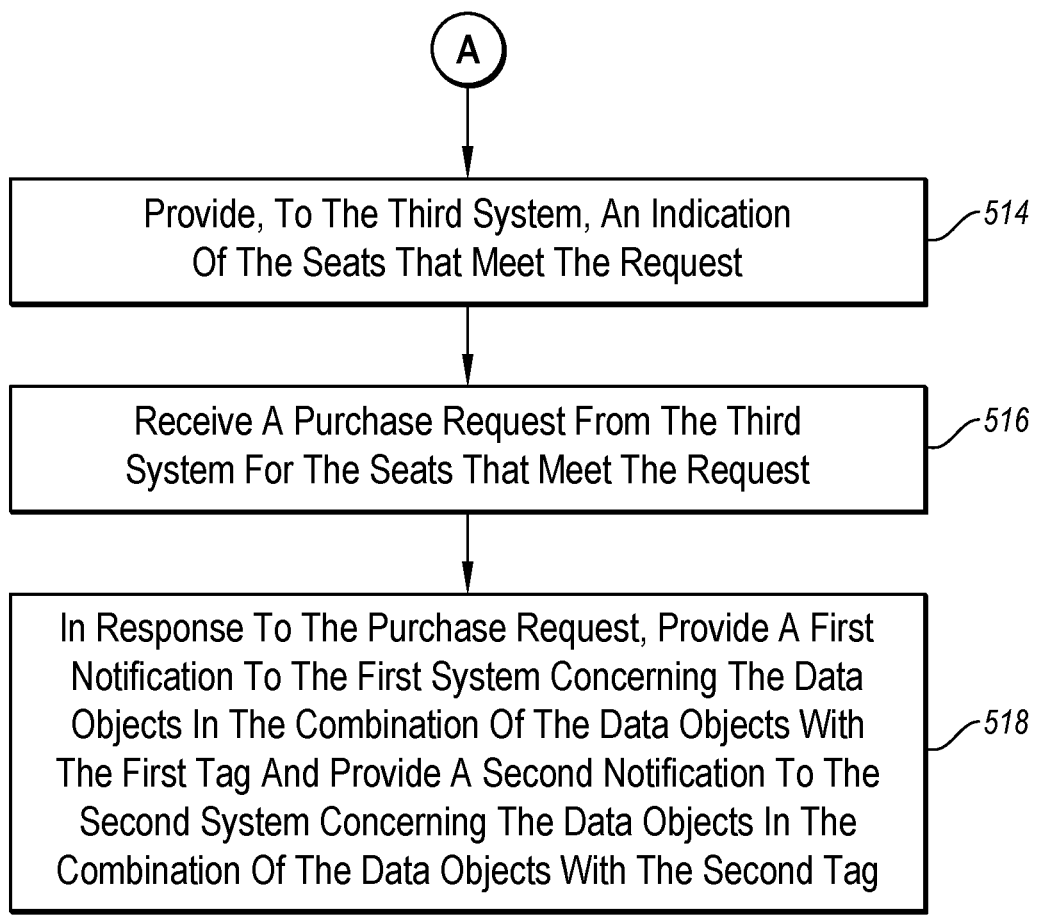

FIGS. 5a and 5b are a flowchart of example operations 500 to blend electronic inventory. The operations 500 may be arranged in accordance with at least one embodiment described in the present disclosure. The operations 500 may be performed, in some embodiments, by a system, such as the system 100 and/or the computing system 400 of FIGS. 1 and 4, respectively. In these and other embodiments, the operations 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The operations 500 may begin at block 502, where first data from a first system may be obtained from over a digital network. In some embodiments, the first system may be controlled by a first entity that controls the venue and that is selling seats to the venue.

In block 504, the first data may be placed into first data objects of multiple data objects in a data storage. The first data objects may be tagged with a first tag. In some embodiments, the first tag may be associated with the first entity.

In block 506, second data from a second system may be obtained over the digital network. In some embodiments, the second system may be controlled by a second entity unassociated with a venue.

In block 508, the second data may be placed into second data objects of the multiple data objects in the data storage. The second data objects may be tagged with a second tag. In some embodiments, each of the first data objects and the second data objects may represent a different seat at the venue. In some embodiments, the second tag may be associated with the second entity.

In block 510, a request for multiple seats at the venue may be obtained from a third system.

In block 512, a combination of the data objects from the data storage that represent seats at the venue that meet the request may be determined. The combination of the data objects may include at least one first data object and at least one second data object and the combination of the data objects may be determined irrespective of whether the data objects include the first tag or the second tag. In some embodiments, less than all of the second data objects from the second data may be included in the combination of the data objects.

In some embodiments, the seats that meet the request from a perspective of the third system are from a single entity selling seats to the venue. In these and other embodiments, the seats that meet the request and that are associated with the first data objects are from a first entity selling seats at the venue and seats that meet the request and that are associated with the second data objects are from a second entity selling seats at the venue.

In block 514, an indication of the seats that meet the request may be provided to the third system. In some embodiments, the indication of the seats that meet the request may not distinguish between the seats associated with the first data objects and the seats associated with the second data objects.

In block 516, a purchase request from the third system may be received for the seats that meet the request. In some embodiments, the purchase request may be a single purchase request for all of the seats that meet the request.

In block 518, in response to the purchase request, a first notification may be provided to the first system concerning the data objects in the combination of the data objects with the first tag and a second notification may be provided to the second system concerning the data objects in the combination of the data objects with the second tag.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For instance, in some embodiments, the operation of placing the first data into the first data objects may further include parsing and formatting the first data. The parsed and formatted first data may be imported into the first data objects in the data storage.

In some embodiments, each of the data objects may include a price for a seat at the venue associated with the data object. In these and other embodiments, the operations may further include determine a price for the seats that meet the request based on the prices from the combination of the data objects.

In some embodiments, the operations may further include in response to answers received from the first and second systems in response to the first and second notifications, provide confirmation of the purchase request to the third system.

In some embodiments, the first system may be controlled by a first entity that controls the venue and that is selling seats to the venue. In these and other embodiments, the operations may further include receive a limit request from the first system and obtain, from a fourth system, a second request for a second plurality of seats at the venue. The operations may further include determine a combination of the first data objects from the data storage that represent seats at the venue that meet the second request without considering the second data objects in the data storage.

Figure 6:
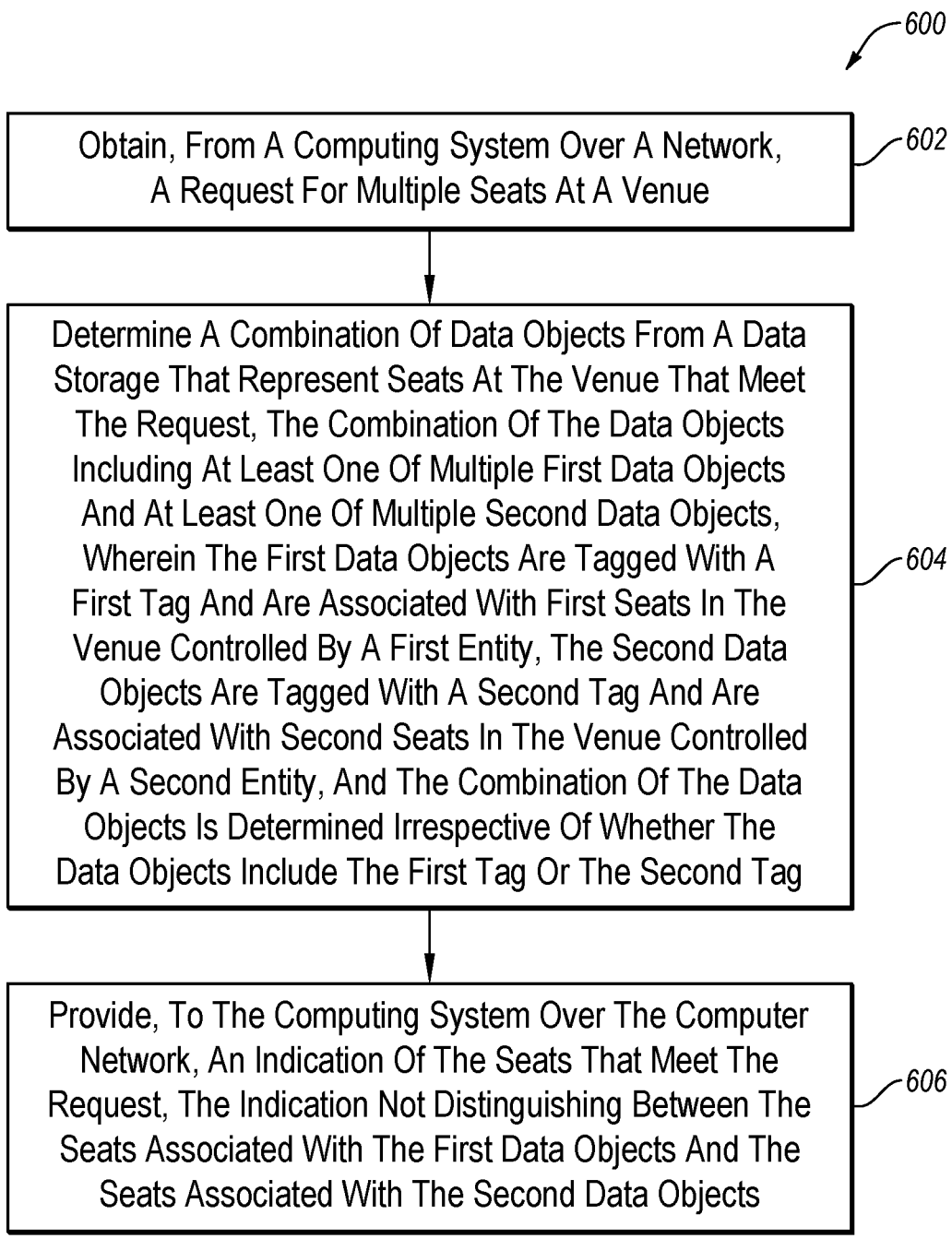
FIG. 6 is a flowchart of example operations to blend electronic inventory.

FIG. 6 is a flowchart of example operations 600 to blend electronic inventory. The operations 600 may be arranged in accordance with at least one embodiment described in the present disclosure. The operations 600 may be performed, in some embodiments, by a system, such as the system 100 and/or the computing system 400 of FIGS. 1 and 4, respectively. In these and other embodiments, the operations 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The operations 600 may begin at block 602, where a request for multiple seats at a venue may be obtained from a computing system.

In block 604, a combination of data objects from a data storage that represent seats at the venue that meet the request may be determined. The combination of the data objects may include at least one of multiple first data objects and at least one of multiple second data objects. In some embodiments, the first data objects may be tagged with a first tag and may be associated with first seats in the venue controlled by a first entity. The second data objects may be tagged with a second tag and may be associated with second seats in the venue controlled by a second entity. The combination of the data objects may be determined irrespective of whether the data objects include the first tag or the second tag.

In some embodiments, less than all of the second data objects may be included in the combination of the data objects and less than all of the first data objects may be included in the combination of the data objects.

In block 606, an indication of the seats that meet the request may be provided to the computing system over the computer network. The indication may not distinguish between the seats associated with the first data objects and the seats associated with the second data objects. In some embodiments, from a perspective of the computing system, the seats that meet the request are from a single entity selling seats to the venue.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the operations 600 may further include receive a purchase request from the computing system for the seats that meet the request and in response to the purchase request, transmit a first notification to a first system concerning the first data objects in the combination of the data objects and transmit a second notification to second system concerning the second data objects in the combination of the data objects. In some embodiments, the operations 600 may further include, in response to answers received from the first and second systems in response to the first and second notification, provide confirmation of the purchase request to the computing system.

In some embodiments, each of the data objects may include a price for a seat at the venue associated with the data object. In these and other embodiments, the operations may further include determine a price for the seats that meets the request based on the prices from the combination of the data objects.

As indicated above, the embodiments described herein may include the use of a special purpose or general purpose computer (e.g., the processor 422 of FIG. 4) including various computer hardware or software modules, as discussed in greater detail below. Further, as indicated above, embodiments described herein may be implemented using computer-readable media (e.g., the memory 424 or data storage 432 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. One or more non-transitory computer-readable media configured to store instructions that when executed by one or more processing systems perform operations, the operations comprising:
    obtain, over a digital network, first data from a first system;
    place the first data into a first data object of a plurality of data objects in a data storage tagged with a first tag;
    obtain, over the digital network, second data from a second system;
    place the second data into a second data object of the plurality of data objects in the data storage tagged with a second tag, wherein each of the first data object and the second data object represent a different seat at a venue;
    obtain, from a third system, a search query for a seat cluster, the seat cluster including a plurality of seats spatially located together at the venue;
    search the data storage to determine a combination of the first data object and the second data object from the data storage that represent a cluster of two or more seats at the venue that meets the search query, the combination of the first data object and the second data object include at least one of the first data object with the first tag and at least one of the second data object with the second tag;
    determine a price of the cluster of two or more seats at the venue based on an average between a price for a first seat with the first tag and a price for a second seat with the second tag, wherein the price for the first seat and the price for the second seat are different prices from different ticket sellers;
    provide, to the third system, an indication and the price of the cluster of two or more seats that meets the search query, a first seat of the cluster of two or more seats represented by the at least one of the first data object with the first tag and a second seat of the cluster of two or more seats represented by the at least one of the second data object with the second tag;
    receive a single purchase request from the third system for the cluster of two or more seats that meets the search query, wherein the single purchase request is associated with a single transfer of funds from a user associated with the single purchase request; and
    in response to the single purchase request, provide a first notification to the first system concerning the data objects in the combination of the first data object and the second data object with the first tag and provide a second notification to the second system concerning the data objects in the combination of the first data object and the second data object with the second tag.

2. The one or more non-transitory computer-readable media of claim 1, wherein the first system is controlled by a first entity that controls the venue and that is selling seats to the venue, and the second system is controlled by a second entity unassociated with the venue that is selling seats at the venue.

3. The one or more non-transitory computer-readable media of claim 1, wherein the search query includes a numerical value indicating a number of the plurality of seats in the seat cluster and the search query does not identify the plurality of seats in the seat cluster.

4. The one or more non-transitory computer-readable media of claim 1, wherein the indication of the cluster of two or more seats that meets the search query does not distinguish between one or more seats of the cluster of two or more seats associated with the first data object and one or more seats of the cluster of two or more seats associated with the second data object.

5. The one or more non-transitory computer-readable media of claim 1, wherein the cluster of two or more seats includes seats along a single row, seats across multiple rows, seats in an "L" shape, seats in a diamond shape, or seats in a triangle shape.

6. The one or more non-transitory computer-readable media of claim 1, wherein each of the first data object and the second data object includes different ticket prices from different sellers, the operations further comprise determine a price for the cluster of two or more seats that meets the search query based on the prices from the combination of the first data object and the second data object.

7. The one or more non-transitory computer-readable media of claim 1, wherein less than all of the second data object from the second data are included in the combination of the first data object and the second data object.

8. The one or more non-transitory computer-readable media of claim 1, wherein from a perspective of the third system the cluster of two or more seats that meets the search query are from a single entity selling seats to the venue, wherein seats from the cluster of two or more seats that are associated with the first data object are from a first entity selling seats at the venue and seats from the cluster of two or more seats that are associated with the second data object are from a second entity selling seats at the venue.

9. The one or more non-transitory computer-readable media of claim 1, wherein placing the first data into the first data object includes:
    parsing the first data;
    formatting the first data; and
    importing the first data into the first data object in the data storage.

10. The one or more non-transitory computer-readable media of claim 1, wherein the first system is controlled by a first entity that controls the venue and that is selling seats to the venue and the operations further comprise:
receiving a limit request from the first system;
obtain, from a fourth system, a second search query for a second seat cluster, the second seat cluster including a second plurality of seats spatially located together at the venue; and
determine a combination of the first data object from the data storage that represent a second cluster of two or more seats at the venue that meets the second search query without considering the second data object in the data storage.

11. A method to blend electronic inventory, the method comprising:
obtaining, over a digital network, first data from a first system;
placing the first data into a first data object of a plurality of data objects in a data storage tagged with a first tag;
obtaining, over the digital network, second data from a second system;
placing the second data into a second data object of the plurality of data objects in the data storage tagged with a second tag, wherein each of the first data object and the second data object represent a different seat at a venue;
obtaining, from a third system, a search query for a seat cluster, the seat cluster including a plurality of seats spatially located together at the venue;
searching the data storage to determine a combination of the first data object and second data object from the data storage that represent a cluster of two or more seats at the venue that meets the search query, the combination of the first data object and the second data object include at least one of the first data object with the first tag and at least one of the second data object with the second tag;
determining a price of the cluster of two or more seats at the venue based on an average between a price for a first seat with the first tag and a price for a second seat with the second tag, wherein the price for the first seat and the price for the second seat are different prices from different ticket sellers;
providing, to the third system, an indication and the price of the cluster of two or more seats that meets the search query, a first seat of the cluster of two or more seats represented by the at least one of the first data object with the first tag and a second seat of the cluster of two or more seats represented by the at least one of the second data object with the second tag;
receiving a purchase request from the third system for the cluster of two or more seats that meets the search query, wherein the purchase request is associated with a single transfer of funds from a user associated with the purchase request; and
in response to the purchase request, providing a first notification to the first system concerning the data objects in the combination of the first data object and the second data object with the first tag and providing a second notification to the second system concerning the data objects in the combination of the first data object and the second data object with the second tag.

12. The method of claim 11, wherein the first system is controlled by a first entity that controls the venue and that is selling seats to the venue, and the second system is controlled by a second entity unassociated with the venue that is selling seats at the venue.

13. The method of claim 11, wherein the indication of the cluster of two or more seats that meets the search query does not distinguish between one or more seats of the cluster of two or more seats associated with the first data object and the one or more seats of the cluster of two or more seats associated with the second data object.

14. The method of claim 11, wherein less than all of the second data object from the second data are included in the combination of the first data object and the second data object.

15. The method of claim 11, wherein from a perspective of the third system the cluster of two or more seats that meets the search query are from a single entity selling seats to the venue wherein seats from the cluster of two or more seats that are associated with the first data object are from a first entity selling seats at the venue and seats from the cluster of two or more seats that are associated with the second data object are from a second entity selling seats at the venue.

16. One or more non-transitory computer-readable media configured to store instructions that when executed by one or more processing systems performs operations, the operations comprising:
obtain, from a computing system over a network, a request for identification of a seat cluster, the seat cluster including a plurality of seats spatially located together at a venue and the request not identifying the plurality of seats in the seat cluster;
determine a combination of first and second data objects from a data storage that represent a cluster of two or more seats at the venue that meets the request, wherein the first data objects are tagged with a first tag and are associated with a first seat in the venue controlled by a first entity, the second data objects are tagged with a second tag and are associated with a second seat in the venue controlled by a second entity, and the combination of the first and second data objects include at least one of the first data objects with the first tag and at least one of the second data objects with the second tag;
determine a price of the cluster of two or more seats at the venue based on an average between a price for the first seat with the first tag and a price for the second seat with the second tag, wherein the price for the first seat and the price for the second seat are different prices from different ticket sellers;
provide, to the computing system over the network, an indication and the price of the cluster of two or more seats that meets the request, the indication not distinguishing between one or more seats of the cluster of two or more seats associated with the first data objects and the one or more seats of the cluster of two or more seats associated with the second data objects; and
receive a single purchase request from the computing system for the cluster of two or more seats that meets the request, wherein the single purchase request is associated with a single transfer of funds from a user associated with the single purchase request.

17. The one or more non-transitory computer-readable media of claim 16, wherein the operations further comprise:
in response to the single purchase request, transmit a first notification to a first system concerning the first data object in the combination of the first and second data object, wherein the first system is associated with the first entity, and transmit a second notification to a second system concerning the second data object in the combination of the first and second data object, wherein the second system is associated with the second entity; and in response to answers received from the first and second systems in response to the first and second notifications, provide confirmation of the single purchase request to the computing system.

18. The one or more non-transitory computer-readable media of claim 16, wherein each of the first and second data objects includes a price for a seat at the venue associated with the first and second data objects, the operations further comprise determine a price for the cluster of two or more seats that meets the request based on the prices from the combination of the first and second data objects.

19. The one or more non-transitory computer-readable media of claim 16, wherein less than all of the second data object are included in the combination of the first and second data objects and less than all of the first data object are included in the combination of the first and second data object.

20. The one or more non-transitory computer-readable media of claim 16, wherein the request is a search query that includes a numerical value that indicates a number of the plurality of seats in the seat cluster and determining the combination of first and second data objects from the data storage includes searching the data storage using the search query to determine the combination of the first and second data objects.

* * * * *